(12) United States Patent
Kobayashi

(10) Patent No.: US 8,480,906 B2
(45) Date of Patent: Jul. 9, 2013

(54) PURE WATER MANUFACTURING METHOD AND PURE WATER MANUFACTURING APPARATUS

(75) Inventor: Hideki Kobayashi, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 363 days.

(21) Appl. No.: 12/736,338

(22) PCT Filed: Mar. 13, 2009

(86) PCT No.: PCT/JP2009/054924
§ 371 (c)(1),
(2), (4) Date: Sep. 30, 2010

(87) PCT Pub. No.: WO2009/122884
PCT Pub. Date: Oct. 8, 2009

(65) Prior Publication Data
US 2011/0210072 A1    Sep. 1, 2011

(30) Foreign Application Priority Data
Mar. 31, 2008   (JP) ................. 2008-093205

(51) Int. Cl.
*C02F 1/32* (2006.01)
(52) U.S. Cl.
USPC ........... 210/660; 210/663; 210/669; 210/763; 210/764; 210/900; 210/748.1; 210/748.11; 210/748.13; 210/748.15
(58) Field of Classification Search
USPC ............. 210/660, 663, 669, 763, 764, 900, 210/748.1, 748.11, 748.13, 748.15
See application file for complete search history.

(56) References Cited

U.S. PATENT DOCUMENTS 6,733,661 B2    5/2004    Mukogawa et al.

FOREIGN PATENT DOCUMENTS

| JP | H09-192658 A | 7/1997 |
| JP | H09-220560 A | 8/1997 |
| JP | H10-94785 A | 4/1998 |
| JP | H10-123118 A | 5/1998 |
| JP | 2001-179252 A | 7/2001 |
| JP | 2007-125519 A | 5/2007 |
| JP | 2007-185587 A | 7/2007 |
| TW | 1240701 | 10/2005 |
| TW | 2007-06246 A | 2/2007 |

OTHER PUBLICATIONS

Chemical Industry and Technology, vol. 15, the sixth issue, pp. 526 to 532, 1997.

*Primary Examiner* — Chester Barry
(74) *Attorney, Agent, or Firm* — Manabu Kanesaka

(57) ABSTRACT

In production of ultrapure water by purifying primary pure water with a secondary pure water manufacturing apparatus and a tertiary pure water manufacturing apparatus, high-purity ultrapure water is produced, wherein generation of hydrogen peroxide is minimized and the concentrations of TOC, DO, and hydrogen peroxide are reduced to the limit. In an ultrapure water manufacturing system, each of the secondary pure water manufacturing apparatus and the tertiary pure water manufacturing apparatus includes an ultraviolet oxidation device and a deionization device, downstream therefrom, by using an ion exchange resin. UV light control is performed in such a way that the hydrogen peroxide concentration results in 1 to 30 μg/L and the TOC concentration results in 1 to 10 μg/L at the outlet of the ultraviolet oxidation apparatus of the secondary pure water manufacturing apparatus and, in addition, the TOC concentration results in 0.1 to 5 μg/L at the outlet of the ultraviolet oxidation apparatus of the tertiary pure water manufacturing apparatus. UV light control is performed in such a way that the TOC concentration results in 1 to 10 μg/L at the outlet of the ultraviolet oxidation apparatus of the secondary pure water manufacturing apparatus and, in addition, the hydrogen peroxide concentration results in 1 to 20 μg/L and the TOC concentration results in 0.1 to 5 μg/L at the outlet of the ultraviolet oxidation apparatus of the tertiary pure water manufacturing apparatus.

15 Claims, 1 Drawing Sheet

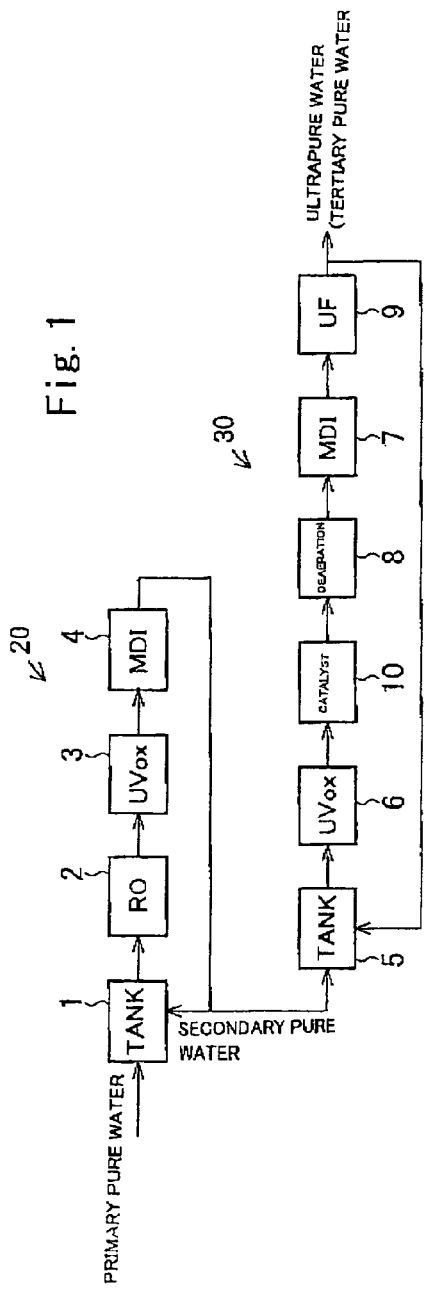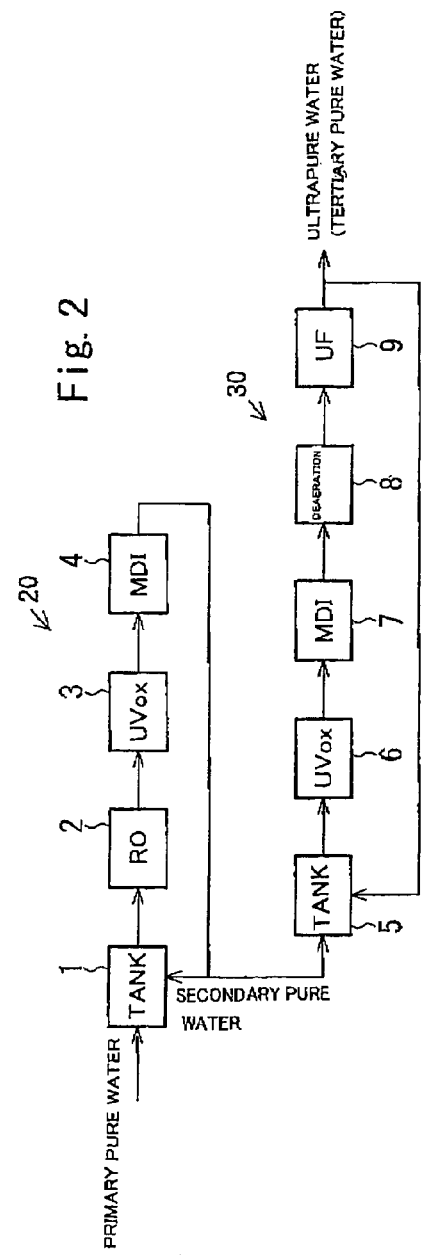

PURE WATER MANUFACTURING METHOD AND PURE WATER MANUFACTURING APPARATUS

RELATED APPLICATIONS

The present application is National Phase of International Application No. PCT/JP2009/054924 filed Mar. 13, 2009, and claims priority from Japanese Application No. 2008-093205, filed Mar. 31, 2008, the disclosure of which is hereby incorporated by reference herein in its entirety.

FIELD OF INVENTION

The present invention relates to a method and an apparatus for manufacturing remarkably high-purity ultrapure water, wherein in production of higher-purity tertiary water by further purifying primary pure water with a secondary pure water manufacturing apparatus and a tertiary pure water manufacturing apparatus, organic materials (TOC components) are subjected to a high degree of oxidative decomposition while generation of hydrogen peroxide is suppressed in ultraviolet oxidation steps in the secondary pure water manufacturing apparatus and the tertiary pure water manufacturing apparatus and, thereby, the concentrations of dissolved oxygen (DO), organic material, and hydrogen peroxide are reduced to the limit.

BACKGROUND OF INVENTION

In general, a conventional ultrapure water manufacturing system is composed of three stages of apparatuses, such as a pretreatment apparatus, a primary pure water manufacturing apparatus, and a secondary pure water manufacturing apparatus. However, in recent years, the level of required water quality has become higher along with miniaturization of semiconductors and, therefore, systems to obtain higher-purity water quality by further disposing a tertiary pure water manufacturing apparatus downstream from the secondary pure water manufacturing apparatus have been adopted in many cases.

In the pretreatment apparatus of the ultrapure water manufacturing system, a pretreatment through filtration of raw water, coagulation sedimentation, microfiltration membrane, or the like is performed and, thereby, suspended substances are removed mainly. The number of fine particles in the water results in usually $10^3$ particles/mL or less by this pretreatment.

The primary pure water manufacturing apparatus is provided with a reverse osmosis (RO) membrane separation apparatus, a deaeration apparatus, a regenerative ion exchange apparatus (mixed bed, 4-bed 5-tower, or the like), an electric deionization apparatus, an oxidation apparatus, e.g., an ultraviolet (UV) irradiation oxidation apparatus, and the like, and removes most of electrolytes, fine particles, viable bacteria, and the like in the pretreated water. The primary pure water manufacturing apparatus is composed of, for example, two RO membrane separation apparatuses and a mixed bed ion exchange apparatus or an ion exchange pure water apparatus and an RO membrane separation apparatus.

The secondary pure water manufacturing apparatus is composed of a feed water pump, a heat exchanger, an ultraviolet irradiation apparatus, e.g., a low-pressure ultraviolet oxidation apparatus or a pasteurizer, a non-regenerative mixed bed ion exchange apparatus or electric deionization apparatus, and a membrane filtration apparatus, e.g., an ultrafiltration (UF) membrane separation apparatus or a microfiltration (MF) membrane separation apparatus. However, in some cases, a deaeration apparatus, e.g., a membrane deaeration apparatus or a vacuum deaeration apparatus, an RO membrane separation apparatus, and a desalting apparatus, e.g., an electric desalting deionization apparatus, may be disposed. The secondary pure water manufacturing apparatus reduces a TOC load on the tertiary pure water manufacturing apparatus downstream therefrom so as to reduce the TOC components in the tertiary pure water (ultrapure water) to the limit by applying a low-pressure ultraviolet oxidation apparatus, disposing a mixed bed ion exchange apparatus downstream therefrom and, thereby, oxidizing and decomposing organic materials (TOC components) in the water with ultraviolet rays and removing the oxidative decomposition products through ion exchange.

The tertiary pure water manufacturing apparatus has the same apparatus configuration as the configuration of the secondary pure water manufacturing apparatus and, thereby, further purify the secondary pure water to produce high-purity ultrapure water.

Main reaction mechanisms and purposes of the individual units of the secondary pure water manufacturing apparatus and the tertiary pure water manufacturing apparatus are as described below.

i) Low-pressure ultraviolet oxidation apparatus; Residual
  TOC coming from the upstream stage is oxidized and decomposed to carbon dioxide or organic acids, e.g., carboxylic acid, by ultraviolet rays with a main wavelength of 185 nm.

ii) Mixed bed ion exchange apparatus; Residual carbonate ions, organic acids, and anionic substances, which result from decomposition through ultraviolet oxidation, and metal ions and cationic substances, which come from the upstream stage, are removed through ion exchange.

iii) Deaeration apparatus; Entrained dissolved gases, e.g., DO (dissolved oxygen), are removed.

iv) UF membrane separation apparatus; Fine particles are removed.

FIG. 2 is a flow diagram showing the typical apparatus configurations of conventional secondary pure water manufacturing apparatus 20 and tertiary pure water manufacturing apparatus 30. In the drawing, RO, UVox, MDI, Deaeration, and UF indicate the following.

RO; Reverse osmosis membrane separation apparatus
UVox; Ultraviolet oxidation apparatus
MDI; Mixed bed ion exchange apparatus
Deaeration; Deaeration apparatus
OF; Ultrafiltration membrane separation apparatus Regarding an ultrapure water manufacturing system shown in FIG. 2, in the secondary pure water manufacturing apparatus 20, primary pure water passed through a tank 1 is treated with a reverse osmosis membrane separation apparatus 2, an ultraviolet oxidation apparatus 3, and a mixed bed ion exchange apparatus 4 sequentially, so that secondary pure water is obtained. A part of the secondary pure water is recycled to the tank 1 and the remainder is fed to the tertiary pure water manufacturing apparatus 30. The secondary pure water introduced into the tertiary pure water manufacturing apparatus 30 is passed through a tank 5 and is treated with an ultraviolet oxidation apparatus 6, a mixed bed ion exchange apparatus 7, a deaeration apparatus 8, and an ultrafiltration membrane separation apparatus 9 sequentially, so that tertiary pure water (ultrapure water) is obtained. A required amount of the resulting ultrapure water is fed to a use point and excess water is returned to the tank 5.

In this regard, in general, the "pure water" here refers to high-purity water specified on a use basis, and is specified here as described below for the sake of convenience. However, in some cases, the specified range is not conformed depending on the quality of raw water or the system configuration.

(A) Primary Pure Water
  Electrical resistivity; 10 MΩ·cm or more
  TOC; 5 to 50 μg/L
(B) Secondary Pure Water
  Electrical resistivity; 18 MΩ·cm or more
  (Metal ion concentration: 5 ng/L or less, residual ion concentration: 10 ng/L or less)
  The number of fine particles; 5 or less of fine particles of 0.1 μm or more in 1 mL
  TOC; 1 to 10 μg/L
(C) Tertiary Pure Water
  TOC; 0.1 to 5 μg/L
  The number of fine particles; 5 or less of fine particles of 0.1 μm or more in 1 mL By the way, the mechanism of oxidative decomposition of the TOC component in the ultraviolet oxidation apparatus is to oxidize and decompose water so as to generate OH radicals and oxidize and decompose the TOC component with the resulting OH radicals. Usually, in the ultraviolet oxidation apparatus of the secondary pure water manufacturing apparatus and also in the ultraviolet oxidation apparatus of the tertiary pure water manufacturing apparatus, the amount of ultraviolet irradiation is specified to be excess irradiation in such a way that TOC in the water can be oxidized and decomposed sufficiently. However, regarding the ultraviolet oxidation apparatus in which the amount of ultraviolet irradiation is large, as described above, in the case where the TOC concentration in the water to be treated is low, OH radicals generated through decomposition of the water become excess. Therefore, excess radicals associate, so as to become hydrogen peroxide. The resulting hydrogen peroxide is decomposed when coming into contact with an ion exchange resin of the downstream mixed bed ion exchange apparatus. At that time, the ion exchange resin is degraded, and fresh TOC derived from the ion exchange resin is generated because of decomposition of the ion exchange resin so as to cause degradation of the quality of the obtained ultrapure water. Furthermore, hydrogen peroxide, which still remains after the water is passed through the mixed bed ion exchange apparatus, degrades the deaeration apparatus and the UF membrane downstream from the mixed bed ion exchange apparatus.

In addition, if hydrogen peroxide is decomposed in the ion exchange apparatus, and furthermore, the deaeration apparatus and the UF membrane separation apparatus downstream therefrom, the following reaction occurs to generate oxygen, so that DO in the water increases.

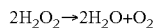

Then, in order to solve the above-described problems resulting from hydrogen peroxide, it has been proposed that an anion exchange tower filled with an anion exchange resin or an adsorption tower filled with a carbon based adsorbing agent is disposed between the ultraviolet oxidation apparatus and the mixed bed ion exchange apparatus, hydrogen peroxide generated in the ultraviolet oxidation apparatus is removed at the stage upstream from the mixed bed ion exchange apparatus and, thereafter, the water is passed through the mixed bed ion exchange apparatus.

The problems related to degradation of the ion exchange resin of the mixed bed ion exchange apparatus and degradation of the deaeration apparatus and the like downstream therefrom, which result from hydrogen peroxide, are solved by disposing the anion exchange tower or the adsorption tower and removing hydrogen peroxide at the stage upstream from the mixed bed ion exchange apparatus. However, regarding the conventional pure water manufacturing apparatuses, sufficient consideration has not been given to the generation of TOC in the anion exchange tower or the adsorption tower. Therefore, there is a problem in that ultrapure water having a low TOC concentration cannot be obtained by applicating them to the secondary pure water manufacturing apparatus.

That is, hydrogen peroxide comes into contact with the anion exchange resin and, thereby, hydrogen peroxide is decomposed and removed. However, along with this, a problem occurs in that TOC components derived from the resin is eluted because of degradation of the anion exchange resin.

Furthermore, regarding the carbon based adsorbing agent as well, there is a TOC elution problem.

Moreover, regarding decomposition of hydrogen peroxide with the anion exchange resin or the activated carbon, problem remains in that the decomposition rate is low, hydrogen peroxide is not removed sufficiently and, therefore, oxygen is generated at the downstream stage so as to increase DO.

Consequently, development of a technology to prevent an occurrence in itself of hydrogen peroxide in the ultraviolet oxidation apparatus is desirable rather than removal of hydrogen peroxide generated in the ultraviolet oxidation apparatus at the stage upstream from the mixed bed ion exchange apparatus.

In this regard, Patent Document 1 described below proposes a method in which water to be treated is brought into contact with a hydrogen peroxide decomposition catalyst including a carrier supporting platinum group metal nanoparticles having an average particle diameter of 1 to 50 nm to decompose hydrogen peroxide in the water, and describes that a hydrogen peroxide decomposition apparatus filled with the above-described hydrogen peroxide decomposition catalyst is disposed downstream from the ultraviolet oxidation apparatus. However, generation in itself of hydrogen peroxide in the ultraviolet oxidation apparatus is not prevented.

Patent Document 1: Japanese Unexamined Patent Application Publication No. 2007-185587

SUMMARY OF INVENTION

It is an object of the present invention to provide a pure water manufacturing method and a pure water manufacturing apparatus to produce high-purity ultrapure water, wherein in production of ultrapure water by purifying primary pure water with a secondary pure water manufacturing apparatus and a tertiary pure water manufacturing apparatus, generation of hydrogen peroxide is minimized in the secondary pure water manufacturing apparatus and the tertiary pure water manufacturing apparatus, furthermore the generated hydrogen peroxide is removed through decomposition in such a way that no load is applied to downstream apparatuses and, thereby, the concentrations of TOC, DO, and hydrogen peroxide are reduced to the limit.

A pure water manufacturing method according to the present invention has:
  a first ultraviolet oxidation step of irradiating primary pure water containing an organic material at a concentration of 5 to 50 μg/L with ultraviolet rays to oxidize and decompose the organic material in the water,
  a first deionization step of deionizing the water treated in the first ultraviolet oxidation step through contact with an ion exchange resin to produce secondary pure water, a second ultraviolet oxidation step of irradiating the secondary pure water passed through the first deionization step with ultraviolet rays to oxidize and decompose the organic material in the water, and a second deionization step of deionizing the water treated in the second ultraviolet oxidation step through contact with an ion exchange resin to produce tertiary pure water, wherein in the first ultraviolet oxidation step, ultraviolet rays are applied at a radiation intensity at which the organic material concentration of the water treated in the first ultraviolet oxidation step results in 1 to 10 µg/L, and in the second ultraviolet oxidation step, ultraviolet rays are applied at a radiation intensity at which the organic material concentration of the water treated in the second ultraviolet oxidation step results in 0.1 to 5 µg/L.

A pure water manufacturing apparatus according to the present invention has;

a first ultraviolet oxidation device to irradiate primary pure water including an organic material at a concentration of 5 to 50 µg/L with ultraviolet rays to oxidize and decompose the organic material in the water, a first deionization device to deionize the water treated in the first ultraviolet oxidation device through contact with an ion exchange resin to produce secondary pure water, a second ultraviolet oxidation device to irradiate the secondary pure water passed through the first deionization device with ultraviolet rays to oxidize and decompose the organic material in the water, and a second deionization device to deionize the water treated in the second ultraviolet oxidation device through contact with an ion exchange resin to produce tertiary pure water, wherein in the first ultraviolet oxidation device, ultraviolet rays are applied at a radiation intensity at which the organic material concentration of the water treated in the first ultraviolet oxidation device results in 1 to 10 µg/L, and in the second ultraviolet oxidation device, ultraviolet rays are applied at a radiation intensity at which the organic material concentration of the water treated in the second ultraviolet oxidation device results in 0.1 to 5 µg/L.

A pure water manufacturing method according to a preferred first aspect of the present invention has the steps of irradiating primary pure water containing an organic material at a concentration of 5 to 50 µg/L with ultraviolet rays to oxidize and decompose the organic material in the water in the first ultraviolet oxidation step, deionizing the water treated in the first ultraviolet oxidation step through contact with an ion exchange resin to produce the secondary pure water in the first deionization step, irradiating the secondary pure water passed through the first deionization step with ultraviolet rays to oxidize and decompose the organic material in the water in the second ultraviolet oxidation step, and deionizing the water treated in the second ultraviolet oxidation step through contact with an ion exchange resin to produce the tertiary pure water in the second deionization step, wherein in the first ultraviolet oxidation step, ultraviolet rays are applied at a radiation intensity at which the hydrogen peroxide concentration of the water treated in the first ultraviolet oxidation step results in 1 to 30 µg/L and the organic material concentration thereof results in 1 to 10 µg/L and, in addition, in the second ultraviolet oxidation step, ultraviolet rays are applied at a radiation intensity at which the organic material concentration of the water treated in the second ultraviolet oxidation step results in 0.1 to 5 µg/L.

A pure water manufacturing method according to a preferred second aspect of the present invention has the steps of irradiating primary pure water containing an organic material at a concentration of 5 to 50 µg/L with ultraviolet rays to oxidize and decompose the organic material in the water in the first ultraviolet oxidation step, deionizing the water treated in the first ultraviolet oxidation step through contact with an ion exchange resin to produce the secondary pure water in the first deionization step, irradiating the secondary pure water passed through the first deionization step with ultraviolet rays to oxidize and decompose the organic material in the water in the second ultraviolet oxidation step, and deionizing the water treated in the second ultraviolet oxidation step through contact with an ion exchange resin to produce the tertiary pure water in the second deionization step, wherein in the first ultraviolet oxidation step, ultraviolet rays are applied at a radiation intensity at which the organic material concentration of the water treated in the first ultraviolet oxidation step results in 1 to 10 µg/L and, in addition, in the second ultraviolet oxidation step, ultraviolet rays are applied at a radiation intensity at which the hydrogen peroxide concentration of the water treated in the second ultraviolet oxidation step results in 1 to 20 and the organic material concentration thereof: results in 0.1 to 5 µg/L.

A pure water manufacturing method according to a preferred third aspect is characterized in that, in the above-described first or second aspect, a first hydrogen peroxide decomposition step to bring the water passed through the first ultraviolet oxidation step into contact with a hydrogen peroxide decomposition catalyst is included between the first ultraviolet oxidation step and the second ultraviolet oxidation step.

A pure water manufacturing method according to a preferred fourth aspect is characterized in that, in the third aspect, the first hydrogen peroxide decomposition step is performed in the first deionization step.

A pure water manufacturing method according to a preferred fifth aspect is characterized in that, in any one of the first to the fourth aspects, a second hydrogen peroxide decomposition step to bring the water passed through the second ultraviolet oxidation step into contact with a hydrogen peroxide decomposition catalyst is included between the second ultraviolet oxidation step and the second deionization step.

A pure water manufacturing method according to a preferred sixth aspect is characterized in that, in the fifth aspect, a deoxidation step to remove dissolved oxygen generated through decomposition of hydrogen peroxide is included between the second hydrogen peroxide decomposition step and the second deionization step.

A pure water manufacturing method according to a preferred seventh aspect is characterized in that, in any one of the third to the sixth aspects, the hydrogen peroxide decomposition catalyst is a catalyst in which platinum group metal particles are supported by a resin carrier.

A pure water manufacturing apparatus according to a preferred eighth aspect is characterized by including a first ultraviolet oxidation device to irradiate primary pure water having an organic material concentration of 5 to 50 µg/L with ultraviolet rays to oxidize and decompose the organic material in the water, a first deionization device to deionize the water treated in the first ultraviolet oxidation device through contact with an ion exchange resin to produce secondary pure water, a second ultraviolet oxidation device to irradiate the secondary pure water passed through the first deionization device with ultraviolet rays to oxidize and decompose the organic material in the water, and a second deionization device to deionize the water treated in the second ultraviolet oxidation device through contact with an ion exchange resin to produce tertiary pure water, wherein in the first ultraviolet oxidation device, ultraviolet rays are applied at a radiation intensity at which the hydrogen peroxide concentration of the water treated in the first ultraviolet oxidation device results in 1 to 30 μg/L and the organic material concentration thereof results in 1 to 10 μg/L and, in addition, in the second ultraviolet oxidation device, ultraviolet rays are applied at a radiation intensity at which the organic material concentration of the water treated in the second ultraviolet oxidation device results in 0.1 to 5 μg/L.

A pure water manufacturing apparatus according to a preferred ninth aspect is characterized by including a first ultraviolet oxidation device to irradiate primary pure water containing an organic material at a concentration of 5 to 50 μg/L with ultraviolet rays to oxidize and decompose the organic material in the water, a first deionization device to deionize the water treated in the first ultraviolet oxidation device through contact with an ion exchange resin to produce secondary pure water, a second ultraviolet oxidation device to irradiate the secondary pure water passed through the first deionization device with ultraviolet rays to oxidize and decompose the organic material in the water, and a second deionization device to deionize the water treated in the second ultraviolet oxidation device through contact with an ion exchange resin to produce tertiary pure water, wherein in the first ultraviolet oxidation device, ultraviolet rays are applied at a radiation intensity at which the organic material concentration of the water treated in the first ultraviolet oxidation device results in 1 to 10 μg/L and, in addition, in the second ultraviolet oxidation device, ultraviolet rays are applied at a radiation intensity at which the hydrogen peroxide concentration of the water treated in the second ultraviolet oxidation device results in 1 to 20 μg/L and the organic material concentration thereof results in 0.1 to 5 μg/L.

A pure water manufacturing apparatus according to a preferred tenth aspect is characterized in that, in the eighth aspect or the ninth aspect, a first hydrogen peroxide decomposition device to bring the water passed through the first ultraviolet oxidation device into contact with a hydrogen peroxide decomposition catalyst is included between the first ultraviolet oxidation device and the second ultraviolet oxidation device.

A pure water manufacturing apparatus according to a preferred eleventh aspect is characterized in that, in the tenth aspect, the first deionization device doubles as the first hydrogen peroxide decomposition device.

A pure water manufacturing apparatus according to a preferred twelfth aspect is characterized in that, in any one of the eighth aspect to the eleventh aspect, a second hydrogen peroxide decomposition device to bring the water passed through the second ultraviolet oxidation device into contact with a hydrogen peroxide decomposition catalyst is included between the second ultraviolet oxidation device and the second deionization device.

A pure water manufacturing apparatus according to a preferred thirteenth aspect is characterized in that, in the twelfth aspect, a deoxidation device to remove dissolved oxygen generated through decomposition of hydrogen peroxide is included between the second hydrogen peroxide decomposition device and the second deionization device.

A pure water manufacturing apparatus according to a preferred fourteenth aspect is characterized in that, in any one of the tenth to the thirteenth aspects, the hydrogen peroxide decomposition catalyst is a catalyst in which platinum group metal particles are supported by a resin carrier.

According to the present invention, remaining of hydrogen peroxide or inflow of hydrogen peroxide into a downstream apparatus can be suppressed by adjusting the ultraviolet intensity in such a way that the residual organic material concentration (amount of decomposition of organic material) or the hydrogen peroxide concentration (amount of generation of hydrogen peroxide) after ultraviolet oxidation in the secondary pure water manufacturing apparatus and the tertiary pure water manufacturing apparatus results in an optimum range. Consequently, an adverse influence of residual hydrogen peroxide on the downstream apparatuses can be prevented and, thereby, high-purity ultrapure water having reduced TOC and DO concentrations can be obtained.

Furthermore, inflow of hydrogen peroxide into the downstream apparatuses can be further reliably prevented by removing hydrogen peroxide with the hydrogen peroxide decomposition catalyst immediately after ultraviolet oxidation and, thereby, very high-purity ultrapure water having remarkably reduced TOC and DO concentrations can be obtained. Moreover, in this case, still higher-purity ultrapure water can be obtained by performing a deoxidization treatment to remove dissolved oxygen generated through decomposition of hydrogen peroxide.

In addition, in the present invention, the radiation intensity of ultraviolet rays in the ultraviolet oxidation apparatus is adjusted, so as to optimize the amount of application thereof. Consequently, an effect of reducing the amount of electric power consumption in the ultraviolet oxidation apparatus is exerted as compared with that in the conventional method in which ultraviolet rays are excessively applied.

BRIEF DESCRIPTION OF DRAWINGS

FIG. 1 is a flow diagram showing the apparatus configurations of a secondary pure water manufacturing apparatus and a tertiary pure water manufacturing apparatus of an ultrapure water manufacturing system suitable for the present invention.

FIG. 2 is a flow diagram showing the typical apparatus configurations of conventional secondary pure water manufacturing apparatus and tertiary pure water manufacturing apparatus.

DETAILED DESCRIPTION

The embodiments according to the present invention will be described in detail below with reference to drawings.

FIG. 1 is a flow diagram showing the configurations of a secondary pure water manufacturing apparatus and a tertiary pure water manufacturing apparatus of an ultrapure water manufacturing system suitable for the present invention. The members performing the same functions as those of the members of the apparatus shown in FIG. 2 are indicated by the same reference numerals. In FIG. 1, reference numeral 10 denotes a catalyst tower filled with a hydrogen peroxide decomposition catalyst and may be abbreviated as a "catalyst". Regarding the ultrapure water manufacturing system shown in FIG. 1, in a secondary pure water manufacturing apparatus 20, primary pure water passed through a tank 1 is treated with a reverse osmosis membrane separation apparatus 2, an ultraviolet oxidation apparatus 3, and a mixed bed ion exchange apparatus 4 sequentially, so that secondary pure water is obtained. A part of the secondary pure water is recycled to the tank 1 and the remainder is fed to a tertiary pure water manufacturing apparatus 30. The secondary pure water introduced into the tertiary pure water manufacturing apparatus 30 is passed through a tank 5 and is irradiated with ultraviolet rays in an ultraviolet oxidation apparatus 6, so that TOC components are decomposed to carbon dioxide and organic acids, e.g., carboxylic acid. Hydrogen peroxide is generated through this ultraviolet irradiation. In the tertiary pure water manufacturing apparatus 30, the water treated with the ultraviolet oxidation apparatus 6 is introduced into the catalyst tower 10, hydrogen peroxide generated in the ultraviolet oxidation apparatus 6 is decomposed, the water treated with the catalyst tower 10 is introduced into a deaeration apparatus 8, dissolved oxygen generated through decomposition of hydrogen peroxide is removed, and the water treated with this deaeration apparatus 8 is passed through a mixed bed ion exchange apparatus 7 and an ultrafiltration membrane separation apparatus 9.

In the present invention, the amount of ultraviolet irradiation of the ultraviolet oxidation apparatus 3 of the secondary pure water manufacturing apparatus 20 and/or the ultraviolet oxidation apparatus 6 of the tertiary pure water manufacturing apparatus 30 is adjusted (hereafter the adjustment of the amount of ultraviolet irradiation may be referred to as "UV light control".) to prevent degradation and the like of an ion exchange resin of the downstream ion exchange device. Each of the secondary pure water manufacturing apparatus 20 and the tertiary pure water manufacturing apparatus 30 includes an ultraviolet oxidation device and a downstream deionization device with an ion exchange resin. The tertiary pure water manufacturing apparatus 30 may not include the catalyst tower 10. The tertiary pure water manufacturing apparatus may produce the tertiary pure water through the sequential treatments with the ultraviolet oxidation apparatus 6, the mixed bed ion exchange apparatus 7, the deaeration apparatus 8, and the ultrafiltration membrane separation apparatus 9.

The deionization device with an ion exchange resin in the present invention is not limited to ion exchange resin apparatuses, e.g., a non-regenerative mixed bed ion exchange apparatus, but may be an electric deionization apparatus filled with an ion exchange resin.

<Regarding Adjustment of Ultraviolet Radiation Intensity>

In the present invention, the ultraviolet radiation intensity of the ultraviolet oxidation apparatus of the secondary pure water manufacturing apparatus and/or the ultraviolet oxidation apparatus of the tertiary pure water manufacturing apparatus is adjusted on the basis of the TOC concentration of the inflow water, so as to suppress generation of hydrogen peroxide. At this time, the concentration of generation of hydrogen peroxide is different depending on the organic species serving as components of TOC. Therefore, it is necessary that the ultraviolet radiation intensity is not determined on the basis of the numerical value of the TOC concentration of the inflow water of the ultraviolet oxidation apparatus, but light control is performed in such a way that the TOC concentration and the hydrogen peroxide concentration at the ultraviolet oxidation apparatus outlet (water treated with the ultraviolet oxidation apparatus) become acceptable as the load on the downstream system on the basis of the measurement.

In the present invention, the UV light control is performed as described in the following items 1) and/or 2).

1) The hydrogen peroxide concentration is 1 to 30 μg/L and the TOC concentration is 1 to 10 μg/L at the ultraviolet oxidation apparatus outlet of the secondary pure water manufacturing apparatus and, in addition, the TOC concentration is 0.1 to 5 μg/L at the ultraviolet oxidation apparatus outlet of the tertiary pure water manufacturing apparatus 2) The TOC concentration is 1 to 10 μg/L at the ultraviolet oxidation apparatus outlet of the secondary pure water manufacturing apparatus and, in addition, the hydrogen peroxide concentration is 1 to 20 μg/L and the TOC concentration is 0.1 to 5 μg/L at the ultraviolet oxidation apparatus outlet of the tertiary pure water manufacturing apparatus Regarding the timing of the adjustment of the ultraviolet intensity, the condition may be set by performing a test in advance before the operation of the ultrapure water manufacturing system is started. Alternatively, a TOC concentration measuring device and a hydrogen peroxide concentration measuring device of the ultraviolet oxidation apparatus outlet water of the ultrapure water manufacturing system and a ultraviolet intensity adjustment device based on the measurement values thereof may be disposed and, thereby, the ultraviolet radiation intensity may be controlled continuously or intermittently.

Means for adjusting the ultraviolet radiation intensity of the ultraviolet oxidation apparatus is not specifically limited. The electric power may be adjusted, or ultraviolet rays may be interrupted with a light-shielding member, a polarization film, or the like.

In the present invention, the theory on TOC reduction through adjustment of ultraviolet radiation intensity is as described below.

If the ultraviolet radiation intensity is small, decomposition of the organic material does not proceed easily and reduction of TOC becomes insufficient. As the ultraviolet radiation intensity increases, decomposition of the organic material proceeds and the TOC concentration of the treated water is reduced. However, even when the radiation intensity is increased exceeding a certain value, the TOG decomposition efficiency is not improved correspondingly to the radiation intensity, and reduction in the TOC concentration of the treated water levels off. The cause for this is estimated that since the ultraviolet radiation intensity is large, the concentration of hydrogen peroxide becomes high because of generation of excessive OH radicals, whereas the contact efficiency between OH radicals and the organic material is reduced as TOC becomes low and, thereby, decomposition of the organic material does not proceed easily. Therefore, even when ultraviolet rays are applied excessively, as in the conventional method, for the purpose of only reduction of TOC, the hydrogen peroxide concentration and DO increase, but reduction of TOC is not facilitated.

Then, in the present invention, ultraviolet rays are applied at a radiation intensity that reduces TOC sufficiently and, in addition, suppresses generation of hydrogen peroxide so as to solve a TOC concentration reduction problem and a residual hydrogen peroxide problem.

Therefore, in the case of the above-described item 1), the UV light control is performed in only the ultraviolet oxidation apparatus of the secondary pure water manufacturing apparatus, the TOC concentration and the hydrogen peroxide concentration at the ultraviolet oxidation apparatus outlet of the secondary pure water manufacturing apparatus are measured, and the ultraviolet radiation intensity of the ultraviolet oxidation apparatus of the secondary pure water manufacturing apparatus is adjusted on the basis of this result in such a way that the hydrogen peroxide concentration results in 1 to 30 μg/L and the TOC concentration results in 1 to 10 μg/L at the ultraviolet oxidation apparatus outlet of the secondary pure water manufacturing apparatus or the ultraviolet radiation intensity is adjusted in such a way as to obtain the above-described treated water on the basis of the preliminary test performed in advance.

On the other hand, in the ultraviolet oxidation apparatus of the tertiary pure water manufacturing apparatus, TOC is decomposed without taking into consideration of generation of hydrogen peroxide.

In the case of the UV light control method described in the item 1), generation of hydrogen peroxide is not taken into consideration in the ultraviolet oxidation apparatus of the tertiary pure water manufacturing apparatus and, therefore, hydrogen peroxide generated excessively may remain. However, generation of hydrogen peroxide is suppressed by performing the UV light control in the ultraviolet oxidation apparatus of the secondary pure water manufacturing apparatus. Consequently, hydrogen peroxide flowing into the tertiary pure water manufacturing apparatus is reduced and, as a result, the residual hydrogen peroxide problem is alleviated, so that tertiary pure water having a low TOC concentration, a low hydrogen peroxide concentration, and low DO can be obtained.

Alternatively, in the case of the above-described item 2), the UV light control is performed in only the ultraviolet oxidation apparatus of the tertiary pure water manufacturing apparatus, the TOC concentration and the hydrogen peroxide concentration at the ultraviolet oxidation apparatus outlet of the tertiary pure water manufacturing apparatus are measured, and the ultraviolet radiation intensity of the ultraviolet oxidation apparatus of the tertiary pure water manufacturing apparatus is adjusted on the basis of this result in such a way that the hydrogen peroxide concentration results in 1 to 20 μg/L and the TOC concentration results in 0.1 to 5 μg/L at the ultraviolet oxidation apparatus outlet of the tertiary pure water manufacturing apparatus or the ultraviolet radiation intensity is adjusted in such a way as to obtain the above-described treated water on the basis of the preliminary test performed in advance.

On the other hand, in the ultraviolet oxidation apparatus of the secondary pure water manufacturing apparatus, TOC is decomposed without taking into consideration of generation of hydrogen peroxide.

In the case of the UV light control method described in the item 2), generation of hydrogen peroxide is not taken into consideration in the ultraviolet oxidation apparatus of the secondary pure water manufacturing apparatus and, therefore, hydrogen peroxide generated excessively may remain. However, generation of hydrogen peroxide is suppressed by performing the UV light control in the ultraviolet oxidation apparatus of the tertiary pure water manufacturing apparatus. Consequently, hydrogen peroxide at the ultraviolet oxidation apparatus outlet of the tertiary pure water manufacturing apparatus is reduced and, as a result, the residual hydrogen peroxide problem is alleviated, so that tertiary pure water having a low TOC concentration, a low hydrogen peroxide concentration, and low DO can be obtained.

In this regard, the effect of the present invention can be obtained by performing only one of the UV light control described in the above-described items 1) and 2). However, it is preferable that both the items 1) and 2) are performed, and the UV light control is performed in each of the ultraviolet oxidation apparatus of the secondary pure water manufacturing apparatus and the ultraviolet oxidation apparatus of the tertiary pure water manufacturing apparatus in such a way that the hydrogen peroxide concentration results in 1 to 30 μg/L and the organic material concentration results in 1 to 10 μg/L at the ultraviolet oxidation apparatus outlet of the secondary pure water manufacturing apparatus and the hydrogen peroxide concentration results in 1 to 20 μg/L and the organic material concentration results in 0.1 to 5 μg/L at the ultraviolet oxidation apparatus outlet of the tertiary pure water manufacturing apparatus.

<Regarding Decomposition of Hydrogen Peroxide>

In the present invention, the UV light control is performed in the ultraviolet oxidation apparatus of the secondary pure water manufacturing apparatus and/or the ultraviolet oxidation apparatus of the tertiary pure water manufacturing apparatus and, thereby, generation of hydrogen peroxide is suppressed. However, it is not possible to completely eliminate generation of hydrogen peroxide at the ultraviolet radiation intensity to reduce TOC sufficiently.

Therefore, it is preferable that hydrogen peroxide flowing from the ultraviolet oxidation apparatus is removed through decomposition at a stage downstream from the ultraviolet oxidation apparatus of the secondary pure water manufacturing apparatus and/or at a stage downstream from the ultraviolet oxidation apparatus of the tertiary pure water manufacturing apparatus.

<Regarding Hydrogen Peroxide Decomposition Catalyst>

It is preferable that a hydrogen peroxide decomposition catalyst is used for decomposition of hydrogen peroxide from the viewpoint of the hydrogen peroxide decomposition efficiency and applicability to the ultrapure water manufacturing system.

As for the hydrogen peroxide decomposition catalyst to be applied, a catalyst in which platinum group metal particles are supported by a carrier, e.g., a resin carrier, preferably a catalyst in which platinum group metal nanoparticles having an average particle diameter of 1 to 50 nm are supported by a resin carrier, is mentioned.

Here, as for the platinum group metal, ruthenium, rhodium, palladium, osmium, iridium, and platinum can be mentioned. One type of the platinum group metals can be used alone, at least two types thereof can be used in combination, or at least two types thereof can be used as an alloys. Alternatively, a refined product of mixture which occurs naturally can also be used without being separated into single substances. Among them, single substances of platinum, palladium, and palladium/palladium alloy or a mixture of at least two types thereof, can be used particularly favorably because the catalytic activity is high.

The platinum group metal has a low elution property with respect to ultrapure water and high catalytic activity and, therefore, is preferable because water can be passed at a high water flow rate and even when any elution occurs, the elution material concentration is suppressed, so that rapid degradation of water quality is suppressed.

A method for manufacturing platinum group metal nanoparticles is not specifically limited, and examples thereof can include a metal salt reduction method and a combustion method. Among them, the metal salt reduction method can be used favorably because production is performed easily and metal nanoparticles having stable quality can be obtained. According to the metal salt reduction method, for example, 0.1 to 0.4 mmol/L of aqueous solution of chloride, nitrate, sulfate, metal complex, or the like of platinum or the like is blended with 4 to 20 equivalents of reducing agent, e.g., alcohol, citric acid or a salt thereof, formic acid, acetone, or acetaldehyde, and boiling is performed for 1 to 3 hours, so that metal nanoparticles can be produced. Furthermore, for example, 1 to 2 mmol/L of hexachloroplatinic acid, potassium hexachloroplatinate, or the like is dissolved into a polyvinylpyrrolidone aqueous solution, a reducing agent, e.g., ethanol, is added, and heating and refluxing are performed in a nitrogen atmosphere for 2 to 3 hours, so that platinum nano-colloidal particles can also be produced.

The average particle diameter of the platinum group metal nanoparticles is preferably 1 to 50 nm, more preferably 1.2 to 20 nm, and further preferably 1.4 to 5 nm. If the average particle diameter of the metal nanoparticles is less than 1 nm, the catalytic activity with respect to removal of hydrogen peroxide through decomposition may be reduced. If the average particle diameter of the metal nanoparticles exceeds 50 nm, the specific surface area of the nanoparticle decreases and the catalytic activity with respect to removal of hydrogen peroxide through decomposition may be reduced.

The carrier to support the platinum group metal nanoparticles is not specifically limited, and examples thereof can include magnesia, titania, alumina, silica-alumina, zirconia, activated carbon, zeolite, diatomaceous earth, and ion exchange resins. Among them, in particular, anion exchange resins can be used favorably. The platinum group metal nanoparticles have an electric double layer and are negatively charged, so as to be stably supported by the anion exchange resin and be not peeled easily. The platinum group metal nanoparticles supported by the anion exchange resin exhibit high catalytic activity with respect to removal of hydrogen peroxide through decomposition. The anion exchange resin used in the present invention is preferably a strongly basic anion exchange resin containing a styrene-divinylbenzene copolymer as a parent substance, and particularly preferably a gel type resin. In this regard, the exchange group of the anion exchange resin is preferably an OH form. The OH form anion exchange resin has an alkaline resin surface and facilitates decomposition of hydrogen peroxide.

The amount of platinum group metal nanoparticles supported by the anion exchange resin is preferably 0.01 to 0.2 percent by weight, and more preferably 0.04 to 0.1 percent by weight. If the amount of supported metal nanoparticles is less than 0.01 percent by weight, the catalytic activity with respect to removal of hydrogen peroxide through decomposition may become insufficient. In the case where the amount of supported metal nanoparticles is 0.2 percent by weight or less, the catalytic activity sufficient for removal of hydrogen peroxide through decomposition is exerted and, usually, it is not necessary that metal nanoparticles exceeding 0.2 percent by weight is supported. In this regard, as the amount of supported metal nanoparticles increases, it becomes more probable that the metal is eluted into the water.

<Regarding Decomposition of Hydrogen Peroxide in Secondary Pure Water Manufacturing Apparatus>

The TOC load on the secondary pure water manufacturing apparatus is high as compared with that on the tertiary pure water manufacturing apparatus. Consequently, there is a limit in reduction of the radiation intensity, and it is believed that even when the UV light control is performed, hydrogen peroxide may be generated in the ultraviolet oxidation apparatus depending on the TOC concentration of the inflow water. At this time, the hydrogen peroxide load on the downstream stage can be reduced reliably by applying a catalyst tower filled with a hydrogen peroxide decomposing catalyst between the ultraviolet oxidation apparatus and the mixed bed ion exchange apparatus in the secondary pure water manufacturing apparatus.

In this regard, in the secondary pure water manufacturing apparatus, a hydrogen peroxide decomposing catalyst may be filled together with the ion exchange resin into the ion exchange apparatus immediately after the ultraviolet oxidation apparatus. For example, in the case where a cation exchange resin and an anion exchange resin are filled into a mixed bed or layered state in the ion exchange apparatus and an operation is performed with water flowing downward, hydrogen peroxide can be removed through decomposition with a hydrogen peroxide decomposition catalyst before the water containing hydrogen peroxide comes into contact with the ion exchange resin by filling the above-described hydrogen peroxide decomposition catalyst on these ion exchange resins. In this manner, inflow of hydrogen peroxide into the tertiary pure water manufacturing apparatus can be suppressed by filling the hydrogen peroxide decomposition catalyst together with the ion exchange resin into the ion exchange apparatus without adding a new facility. Therefore, the possibility of application to existing apparatuses increases.

As for a method for filling the hydrogen peroxide decomposition catalyst into the ion exchange apparatus, a mixed bed may be formed by filling a mixture with the ion exchange resin, or as described above, multilayer filling may be performed by disposing a layer of the hydrogen peroxide decomposition catalyst independently on the ion exchange resin layer, that is, on the upstream side from the ion exchange resin layer.

<Regarding Decomposition of Hydrogen Peroxide in Tertiary Pure Water Manufacturing Apparatus>

The TOC load on the tertiary pure water manufacturing apparatus is low. Consequently, as described above, even when the UV light control is performed, excess OH radicals are generated and, thereby, the hydrogen peroxide concentration is not reduced sufficiently in some cases. In this case, it is preferable that a hydrogen peroxide decomposition catalyst tower is disposed downstream from the ultraviolet oxidation apparatus of the tertiary pure water manufacturing apparatus so as to decompose hydrogen peroxide in the hydrogen peroxide decomposition catalyst tower. At this time, DO increases because oxygen is generated through decomposition of hydrogen peroxide in some cases. In the case where the water having high DO is added to the ion exchange apparatus, the resin may be degraded through oxidation, so that TOC elution may occur. There is no TOC removal device downstream from the mixed bed ion exchange apparatus of the tertiary pure water manufacturing apparatus and, therefore, it is necessary to suppress the DO load on the ion exchange apparatus. Consequently, it is preferable that a deaeration apparatus, e.g., a membrane deaeration apparatus, is disposed immediately after the hydrogen peroxide decomposition catalyst tower.

In this case, regarding the apparatus configuration of the tertiary pure water manufacturing apparatus, for example, as shown in FIG. 1, the water is treated by passing the tank 5, the ultraviolet oxidation apparatus 6, the hydrogen peroxide decomposition catalyst tower 10, the deaeration apparatus 8, the mixed bed ion exchange apparatus 7, and the ultrafiltration membrane separation apparatus 9 in that order.

EXAMPLES

The present invention will be described below further specifically with reference to examples and comparative examples.

Comparative Example 1

Experimental Condition

Ultrapure water was produced, where the amount of UV irradiation was specified to be 0.28 kWh/m$^3$, which was excessive irradiation, in each of the ultraviolet oxidation apparatuses of the secondary pure water manufacturing apparatus and the tertiary pure water manufacturing apparatus in the apparatus configuration shown in FIG. 2. The water quality at each section is shown in Table 1.

<Results>

Since UV was applied excessively, TOC was reduced. However, the hydrogen peroxide concentration increased and even after the tertiary pure water manufacturing apparatus, the residue concentrations were high in such a way that the hydrogen peroxide concentration was 12 μg/L and DO was 1.5 μg/L.

TABLE 1

| | | Comparative example 1 (no UV light control) | | | | | |
|---|---|---|---|---|---|---|---|
| | Primary | Secondary pure water manufacturing apparatus※ | | Tertiary pure water manufacturing apparatus※ | | | |
| Measurement | pure | | | | | Membrane | |
| item | water | UVox | MDI | UVox | MDI | deaeration | UF |
| TOC(μg/L) | 32 | 4.8 | 3.8 | 2.3 | 1.5 | 1.5 | 1.4 |
| Hydrogen peroxide (μg/L) | <1 | 35 | 16 | 32 | 14 | 13 | 12 |
| DO(μg/L) | 3000 | 890 | 900 | 890 | 920 | 0.7 | 1.5 |

※Water quality of outflow water of each apparatus

Example 1

Experimental Condition

Regarding the pure water manufacturing system of Comparative example 1, an appropriate UV radiation intensity was determined to be 0.11 kWh/m³ in advance from the balance between TOC decomposition and hydrogen peroxide generation, and in the ultraviolet oxidation apparatus of the secondary pure water manufacturing apparatus, UV light control was performed, so that the UV radiation intensity was specified to be 0.11 kWh/m³. However, in the ultraviolet oxidation apparatus of the tertiary pure water manufacturing apparatus, the UV light control was not performed, and irradiation was performed at UV radiation intensity of 0.28 kWh/m³, which was excessive irradiation.
<Results>

In the secondary pure water manufacturing apparatus, the UV light control was performed appropriately and, thereby, generation of hydrogen peroxide was able to be suppressed, although the amount of reduction in TOC was somewhat smaller than that in Comparative example 1. However, in the tertiary pure water manufacturing apparatus, UV was applied excessively. Consequently, slight increases in the hydrogen peroxide concentration and DO were observed, but improvements were observed as compared with those in Comparative example 1.

Example 2

Experimental Condition

Regarding the pure water manufacturing system of Comparative example 1, an appropriate UV radiation intensity was determined to be 0.11 kWh/m³ in advance from the balance between TOC decomposition and hydrogen peroxide generation, and in the ultraviolet oxidation apparatus of the tertiary pure water manufacturing apparatus, UV light control was performed, so that the UV radiation intensity was specified to be 0.11 kWh/m³. However, in the ultraviolet oxidation apparatus of the secondary pure water manufacturing apparatus, the UV light control was not performed, and irradiation was performed at UV radiation intensity of 0.28 kWh/m³, which was excessive irradiation.
<Results>

In the secondary pure water manufacturing apparatus, UV was applied excessively and, thereby, increases in the hydrogen peroxide concentration and DO were observed. However, in the tertiary pure water manufacturing apparatus, the UV light control was performed appropriately and, thereby, TOC was able to be reduced while generation of hydrogen peroxide was suppressed.

TABLE 2

| | | Example 1 (UV light control in only secondary pure water manufacturing apparatus) | | | | | |
|---|---|---|---|---|---|---|---|
| | Primary | Secondary pure water manufacturing apparatus※ | | Tertiary pure water manufacturing apparatus※ | | | |
| Measurement | pure | | | | | Membrane | |
| item | water | UVox | MDI | UVox | MDI | deaeration | UF |
| TOC(μg/L) | 32 | 5.3 | 3.4 | 2.4 | 1.5 | 1.5 | 1.4 |
| Hydrogen peroxide (μg/L) | <1 | 16 | 8 | 25 | 12 | 13 | 10 |
| DO(μg/L) | 3000 | 900 | 905 | 890 | 920 | 0.6 | 0.7 |

※Water quality of outflow water of each apparatus

TABLE 3

Example 2 (UV light control in only tertiary pure water manufacturing apparatus)

| Measurement item | Primary pure water | Secondary pure water manufacturing apparatus✕ | | Tertiary pure water manufacturing apparatus✕ | | | |
|---|---|---|---|---|---|---|---|
| | | UVox | MDI | UVox | MDI | Membrane deaeration | UF |
| TOC(μg/L) | 32 | 4.8 | 3.4 | 2.4 | 1.5 | 1.5 | 1.4 |
| Hydrogen peroxide (μg/L) | <1 | 22 | 16 | 18 | 8 | 9 | 8 |
| DO(μg/L) | 3000 | 890 | 900 | 890 | 900 | 0.6 | 0.7 |

✕Water quality of outflow water of each apparatus

Example 3

Experimental Condition

Regarding the pure water manufacturing system of Comparative example 1, an appropriate UV radiation intensity was determined to be 0.11 kWh/m$^3$ in advance from the balance between TOC decomposition and hydrogen peroxide generation, and in the ultraviolet oxidation apparatus of the secondary pure water manufacturing apparatus and the ultraviolet oxidation apparatus of the tertiary pure water manufacturing apparatus, UV light control was performed, so that the UV radiation intensity was specified to be 0.11 kWh/m$^3$.

<Results>

In the secondary pure water manufacturing apparatus, the UV light control was performed appropriately and, thereby, generation of hydrogen peroxide was able to be suppressed, although the amount of reduction in TOC was somewhat smaller than that in Comparative example 1. Likewise, in the tertiary pure water manufacturing apparatus, UV control was performed appropriately and, thereby, TOC was able to be further reduced while generation of hydrogen peroxide was suppressed.

Example 4

Experimental Condition

Ultrapure water was produced in a manner similar to that in Example 3, wherein a hydrogen peroxide decomposition apparatus composed of a catalyst tower filled with a Pd catalyst-supporting resin is disposed immediately after the ultraviolet oxidation apparatus of the tertiary pure water manufacturing apparatus, as shown in FIG. 1, and the order of the MDI (non-regenrative mixed bed ion exchange apparatus) and membrane deaeration apparatus was reversed.

In this regard, in the Pd catalyst-supporting resin used, platinum nanoparticles having an average particle diameter of 3.5 nm were supported by a strongly basic gel type anion exchange resin in the amount of support of 0.07 percent by weight.

<Results>

In Example 3, the ion exchange resin of MDI was oxidized with hydrogen peroxide generated through ultraviolet oxidation and, thereby, TOC elution occurred. However, according to the present configuration, ion exchange was able to be performed in the state, in which ultraviolet oxidation and DO had been reduced, after the membrane deaeration. Consequently, TOC of the tertiary pure water was reduced as compared with that in Example 3. Likewise, the hydrogen peroxide concentration and DO of the tertiary pure water were able to be reduced sufficiently.

TABLE 4

Example 3 (UV light control in secondary pure water manufacturing apparatus and tertiary pure water manufacturing apparatus)

| Measurement item | Primary pure water | Secondary pure water manufacturing apparatus✕ | | Tertiary pure water manufacturing apparatus✕ | | | |
|---|---|---|---|---|---|---|---|
| | | UVox | MDI | UVox | MDI | Membrane deaeration | UF |
| TOC(μg/L) | 32 | 5.3 | 3.4 | 2.4 | 1.5 | 1.5 | 1.4 |
| Hydrogen peroxide (μg/L) | <1 | 16 | 8 | 12 | 5 | 6 | 7 |
| DO(μg/L) | 3000 | 900 | 905 | 890 | 895 | 0.6 | 0.7 |

✕Water quality of outflow water of each apparatus

TABLE 5

Example 4 (UV light control in secondary pure water
manufacturing apparatus and tertiary pure water

| Measurement item | Primary pure water | Secondary pure water manufacturing apparatus※ | | Tertiary pure water manufacturing apparatus※ | | | | |
|---|---|---|---|---|---|---|---|---|
| | | UVox | MDI | UVox | Catalyst | Membrane deaeration | MDI | UF |
| TOC(μg/L) | 32 | 5.3 | 3.4 | 2.4 | 1.5 | 1.5 | 0.5 | 0.4 |
| Hydrogen peroxide (μg/L) | <1 | 16 | 8 | 18 | <1 | <1 | <1 | <1 |
| DO(μg/L) | 3000 | 900 | 905 | 890 | 920 | 0.5 | 0.5 | 0.5 |

※Water quality of outflow water of each apparatus

Example 5

Experimental Conditione

Ultrapure water was produced in a manner similar to that in Example 4, wherein MDI of the secondary pure water manufacturing apparatus was a mixed bed type and was filled with the same Pd catalyst-supporting resin as that used in Example 4.
<Results>
Since TOC and hydrogen peroxide were reduced sufficiently at the stage of the secondary pure water manufacturing apparatus, a load on the tertiary pure water manufacturing apparatus was reduced. Consequently, the tertiary pure water having the purity further higher than that in Example 4 was able to be produced.

TABLE 6

Example 5 (UV light control in secondary pure water manufacturing apparatus and tertiary
pure water manufacturing apparatus + hydrogen peroxide decomposition in secondary
pure water manufacturing apparatus and tertiary pure water manufacturing apparatus)

| Measurement item | Primary pure water | Secondary pure water manufacturing apparatus※ | | Tertiary pure water manufacturing apparatus※ | | | | |
|---|---|---|---|---|---|---|---|---|
| | | UVox | MDI · Catalyst | UVox | Catalyst | Membrane deaeration | MDI | UF |
| TOC(μg/L) | 32 | 5.3 | 2.4 | 0.7 | 0.7 | 0.7 | 0.3 | 0.2 |
| Hydrogen peroxide (μg/L) | <1 | 16 | 4 | 12 | <1 | <1 | <1 | <1 |
| DO(μg/L) | 3000 | 900 | 905 | 890 | 896 | 0.5 | 0.5 | 0.5 |

※Water quality of outflow water of each apparatus

The present invention has been described in detail with reference to specific aspects. However, it is obvious to a person skilled in the art that various modifications can be made without departing from the spirit or scope of the present invention.

The present invention contains subject matter related to Japanese Patent Application (Japanese Patent Application No. 2008-093205) filed on Mar. 31, 2008, the entire contents of which are incorporated herein by reference.

The invention claimed is:
1. A pure water manufacturing method, comprising:
a first ultraviolet (UV) oxidation step of irradiating primary pure water containing an organic material at a concentration of 5 to 50 μg/L with ultraviolet rays to oxidize and decompose the organic material in the primary pure water, thereby obtaining a first UV oxidized water;
a first deionization step of contacting the first UV oxidized water with a first ion exchange resin to deionize the first UV oxidized water, thereby producing secondary pure water, and sending a part of the secondary pure water to the first UV oxidation step;
a second ultraviolet (UV) oxidation step of irradiating the secondary pure water passed through the first deionization step with ultraviolet rays to oxidize and decompose the organic material in the secondary pure water, thereby obtaining a second UV oxidized water; and
a second deionization step of contacting the second UV oxidized water with a second ion exchange resin to deionize the second UV oxidized water, thereby producing tertiary pure water, and sending a part of the tertiary pure water to the second UV oxidation step;
wherein the first ultraviolet oxidation step includes
measuring a total organic carbon (TOC) concentration of the first UV oxidized water to obtain a first TOC concentration, and
applying the ultraviolet rays at a radiation intensity at which the first TOC concentration of the first UV oxidized water treated in the first ultraviolet oxidation step results in 1 to 10 μg/L, and
the second ultraviolet oxidation step includes
measuring a TOC concentration of the second UV oxidized water to obtain a second TOC concentration, and
applying the ultraviolet rays at a radiation intensity at which the second TOC concentration of the second UV oxidized water treated in the second ultraviolet oxidation step results in 0.1 to 5 µg/L.

2. The pure water manufacturing method according to claim 1, wherein a $H_2O_2$ concentration of at least one of the first UV oxidized water treated in the first ultraviolet oxidation step and the second UV oxidized water treated in the second ultraviolet oxidation step is 1 to 30 µg/L.

3. The pure water manufacturing method according to claim 1, wherein a $H_2O_2$ concentration of the first UV oxidized water treated in the first ultraviolet oxidation step is 1 to 30 µg/L.

4. The pure water manufacturing method according to claim 1, wherein a $H_2O_2$ concentration of the second UV oxidized water treated in the second ultraviolet oxidation step is 1 to 20 µg/L.

5. The pure water manufacturing method according to claim 1, further comprising a hydrogen peroxide decomposition step of contacting the first UV oxidized water, the secondary pure water, or the second UV oxidized water with a hydrogen peroxide decomposition catalyst at least one of between the first ultraviolet oxidation step and the second ultraviolet oxidation step and between the second ultraviolet oxidation step and the second deionization step.

6. The pure water manufacturing method according to claim 5, wherein the hydrogen peroxide decomposition step is performed in the first deionization step.

7. The pure water manufacturing method according to claim 5, further comprising wherein a deoxidation step of removing dissolved oxygen generated through decomposition of the hydrogen peroxide between the second ultraviolet oxidation step and the second deionization step.

8. The pure water manufacturing method according to claim 1, wherein the method is used for only the primary pure water containing an organic material at a concentration of 5 to 50 µg/L.

9. A pure water manufacturing apparatus, comprising:
a first ultraviolet (UV) oxidation device irradiating primary pure water containing an organic material at a concentration of 5 to 50 µg/L with ultraviolet rays to oxidize and decompose the organic material in the primary pure water to produce a first UV oxidized water;
a first deionization device contacting the first UV oxidized water with a first ion exchange resin to deionize the first UV oxidized water to produce secondary pure water, and the first deionization device sending a part of the secondary pure water to the first UV oxidation device;
a second ultraviolet (UV) oxidation device irradiating the secondary pure water passed through the first deionization device with ultraviolet rays to oxidize and decompose the organic material in the secondary pure water to produce a second UV oxidized water; and
a second deionization device contacting the second UV oxidized water with a second ion exchange resin to deionize the second UV oxidized water to produce tertiary pure water, and the second deionization device sending a part of the tertiary pure water to the second UV oxidation device;
wherein the first ultraviolet oxidation device measures a total organic carbon (TOC) concentration of the first UV oxidized water to obtain a first TOC concentration,
the ultraviolet rays are applied at a radiation intensity at which the first TOC concentration of the first UV oxidized water treated in the first ultraviolet oxidation device results in 1 to 10 µg/L,
the second ultraviolet oxidation device measures a TOC concentration of the second UV oxidized water to obtain a second TOC concentration, and
the ultraviolet rays are applied at a radiation intensity at which the second TOC concentration of the second UV oxidized water treated in the second ultraviolet oxidation device results in 0.1 to 5 µg/L.

10. The pure water manufacturing apparatus according to claim 9, wherein a $H_2O_2$ concentration of at least one of the first UV oxidized water treated in the first ultraviolet oxidation device and the second UV oxidized water treated in the second ultraviolet oxidation device is 1 to 30 µg/L.

11. The pure water manufacturing apparatus according to claim 9, wherein a $H_2O_2$ concentration of the first UV oxidized water treated in the first ultraviolet oxidation device is 1 to 30 µg/L.

12. The pure water manufacturing apparatus according to claim 9, wherein a $H_2O_2$ concentration of the second UV oxidized water treated in the second ultraviolet oxidation device is 1 to 20 µg/L.

13. The pure water manufacturing apparatus according to claim 9, further comprising a hydrogen peroxide decomposition device contacting the first UV oxidized water, the secondary pure water, or the second UV oxidized water with a hydrogen peroxide decomposition catalyst at least one of between the first ultraviolet oxidation device and the second ultraviolet oxidation device and between the second ultraviolet oxidation device and the second deionization device.

14. The pure water manufacturing apparatus according to claim 13, further comprising a reverse osmosis membrane separation apparatus at an upstream side of the first UV oxidation device.

15. The pure water manufacturing apparatus according to claim 14, further comprising an ultrafiltration membrane separation unit at a downstream side of the second UV oxidation device.

* * * * *